May 2, 1944.    J. OPIE    2,348,144
DEVICE FOR PACKAGING HAMS OR THE LIKE
Filed Jan. 22, 1942    2 Sheets-Sheet 1

Inventor.
John Opie
by John F. Brezina
Attorney.

May 2, 1944.                J. OPIE                2,348,144
DEVICE FOR PACKAGING HAMS OR THE LIKE
Filed Jan. 22, 1942        2 Sheets-Sheet 2

Inventor.
John Opie
by John F Brezina
Attorney.

Patented May 2, 1944

2,348,144

UNITED STATES PATENT OFFICE 2,348,144

DEVICE FOR PACKAGING HAMS OR THE LIKE

John Opie, Chicago, Ill.

Application January 22, 1942, Serial No. 427,702

6 Claims. (Cl. 226—18)

My invention is directed to a nozzle-like device adapted to facilitate the packaging or enclosure of a unitary or compressed body of food, meat or the like, and is especially advantageous for use in aiding the insertion of compressed meat bodies such as hams into open ended containers such as artificial or natural casings, and preferably open ended containers or casings which are made of flexible and yieldable material.

In the processes of preparing hams and certain types of sausages, and other compressed food bodies for market, the first step is usually to form the meat body into a unit or single mass, which step is usually accomplished by one or another form of suitable press. Most such bodies are as a rule elongated and in many instances substantially cylindrical, particularly when the same are to be enclosed within tube-like synthetic casings of cellulosic material. For reasons of proper appearance, as well as the elimination of undesirable air pockets and to prevent the pressed meat body from self-distortion into irregular shapes, it is desirable that the food or meat body, and particularly hams and sausages, fit tightly within the protective and retaining covering or container within which it is to be displayed and marketed. Therefore, the mounting of the casing, covering or container, or in other words the insertion of a compressed food body such as ham, is one requiring considerable time-taking manual work which results in disproportionate labor costs as well as a resulting undesirable shape and appearance of the finished ham or other food body.

In presently known steps of sausage and ham manufacture, the meat body, frequently including also seasoning of the food ingredients, are first pressed into desired form which in the case of boiled hams is elongated and round and substantially cylindrical or in some instances substantially rectangular with rounded corners and ends. Such pressed together meat bodies are then pushed or projected either manually or mechanically from the press and thereupon the tube-like open ended casing, either natural or synthetic, is manually pulled over the meat body from one end thereof toward the other and thereupon the projecting ends gathered together and frequently tied with string or the like. When the meat body or ham is released from the pressures subjected in the press, there is in many instances the tendency of the muscles or meat units to expand outwardly, though irregularly, with respect to the desired even surfaces of the ham.

To overcome this natural tendency and consequent distortion leading to undesirable irregular shapes, I have found that there is a very definite advantage in maintaining the ham or meat body under some pressure to prevent irregular expansion and distortion during the insertions thereof into the casings.

It is, therefore, an important object of my invention to provide a device which is preferably, though not necessarily, adapted to be either attached to the outlet end of a sausage, ham or food press or packaging machine or mounted and connected adjacent such outlet, and which said device consists of a segmental nozzle or spout-like device on the outer end of which the casing or container may be partially manually mounted. Said nozzle device of my invention is adapted to form an enclosed path through which the ham or food body is positioned as it is being inserted into the casing, to thereby prevent undesirable expansion and consequent distortion of the ham or food body before it is actually within the enclosed casing.

As it is important to provide a neat appearing and marketable ham or sausage which is defined by substantially even and regular surfaces, both round and straight, it has been necessary to use a casing, either synthetic or natural, whose normal diameter or circumference is substantially less than the corresponding dimensions of the ham or meat body which is to be inserted thereinto, this to prevent distortion and expansion after the ham or meat body is within the casing. Therefore, one material difficulty has been that the casing, preparatory to insertion of the ham or meat body has had to be manually stretched and thereby enlarged at its inlet end, this being time-taking and tedious work frequently results in tearing and thereby ruining the casing. These objectionable features are entirely obviated by the use of my nozzle-like or spout-like device which permits the wetted casing to be placed upon its outlet end when the unit is contracted or held together to define the small-as-possible passage.

My said device further provides cooperable pivotally mounted segments or elements which, after mounting thereon of the entrance end of a casing or container, will be pressed apart by the engagement of the surfaces of the ham or food body against the inner surfaces of said elements to thereby grip, particularly stretch and retain the container or casing as the ham body is pushed through said device, such holding engagement continuing until the ham or food body is entirely within the casing, whereupon the engaged entrance end of the casing may be manually pulled from engagement with my device.

A further object of my invention is the provision of a nozzle-like device through which hams, sausages or meat bodies are adapted to be passed during the enclosures thereof into casings or the like and which have a plurality of independent, separable, finger-like curved, gripping and holding elements, all of which said members are connected at one end to a manually movable element so that said elements may be selectively projected to bring their outer ends into relatively close-together positions, and also retracted to cause spreading apart thereof to thereupon grip and pull the entrance end of a casing or container over the outlet end of the nozzle device.

A further important object of my invention is the provision of a spout-like device of the described class which includes a nozzle of rounded or other shape, a collar slidable thereon and a plurality of finger-like curved gripping elements, removably connected at one end to said collar so that movement of said collar toward said nozzle outlet will project said gripping and holding members to positions wherein they define a circular area substantially smaller than the passage through said nozzle device, and which upon movement of said collar away from the outlet of said nozzle device will retract and gradually spread apart said gripping and holding members to thereby grip and hold the entrance end of a casing or container about said nozzle outlet.

A further important object of my invention is the provision of gripping and holding members which are removably mounted on the aforementioned parts to facilitate their cleaning as well as the provision of the device itself as a unit easily removable from the provided mounting means on the outlet end of a press or packaging machine.

Other further important objects of my invention will be apparent from the following description and appended claims.

This invention is in a preferred form is illustrated and described in the following, reference being had to the accompanying drawings by reference numerals.

Figure 1:
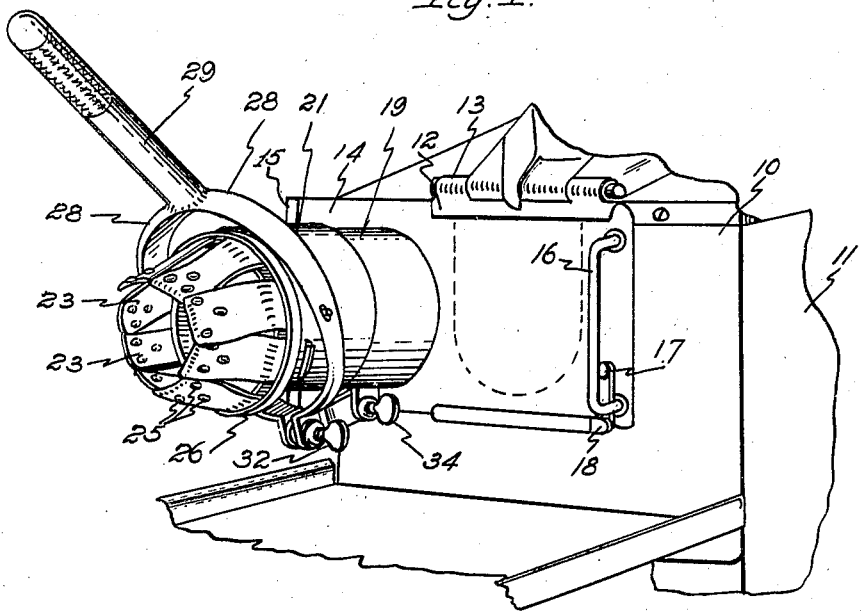
Fig. 1 is a perspective view illustrating one form of my spout-like or nozzle device removably and slidably mounted upon the outlet end of a ham and food press.

Referring to Fig. 1, reference numeral 10 designates the vertically extending end wall of a ham or food press which may be of any type, either manual, pneumatic or otherwise power driven. Only fragments of the frame and top portion of such ham press are shown for illustration.

Numeral 12 designates a downwardly depending metal flange which forms an integral extension of the hinged knuckles 13, shown in Fig. 1, said hinged knuckles providing means for pivotally mounting a suitable mounting member on which pressure plates of suitable form (not shown) are adapted to be mounted for exerting transverse pressure against the ham or food body. One example of these are illustrated and described in my co-pending application for patent, Serial No. 400,922.

Reference numeral 14 designates a flat metal plate of substantially rectangular form which has one end edge bent outwardly to form a projecting stop flange 15. Said mounting plate carries a suitably mounted handle 16 at its opposite end and also a pivoted latch or lever 17 which depends from a pivoting rivet as illustrated in Fig. 1 and terminates substantially at the lower longitudinal edge of said mounting plate 14. An elongated strip is secured by welding or the like along its lower edge to the end wall 10 of the press and has one end bent angularly and outwardly to form a latch or lock member 18 as shown in Fig. 1. In Fig. 1 the mounting plate 14 as well as the nozzle device is slid into a position wherein it obstructs the outlet end of the ham or food press, said outlet end being substantially in the position illustrated in dotted lines. In this position said plate 14 acts as a baffle or pressure plate against which the ham or food body within the press is pressed when longitudinal stresses are imparted thereto, one illustration of which is described in my co-pending application, Serial No. 400,922.

When the operator pulls the slidable plate 14 to the right, the upper end of stop flange 15 engages the end portion of flange 12 to thereby stop or limit the sliding movement of plate 14 in right hand direction and at the same time register the opening thru plate 14 with the outlet opening of the wall or panel 10 thru which the meat body will be passed. Said stop flange 15 thereby prevents the operator from pulling said plate either too far or not far enough.

The latch or lever 17, when in depending position, engages the lock member 18 to limit the movement of slidable plate 14 in left hand direction, so that the operator will not push or pull the plate 14 and attached parts entirely out of the machine. When said plate 14 and attached parts are to be removed entirely, as for cleaning, the latch 17 is held up during such removal so that it will not engage lock member 18.

After the longitudinal pressure is imparted to the ham and then such pressure released, as I have described in my said co-pending application, the operator will grip the handle 16 and pull it toward the viewer's right looking at Fig. 1, so that the relatively large opening or aperture which is defined by the inner surfaces of the metal cylinder 19, will register with the outlet opening of the ham press.

Figure 2:
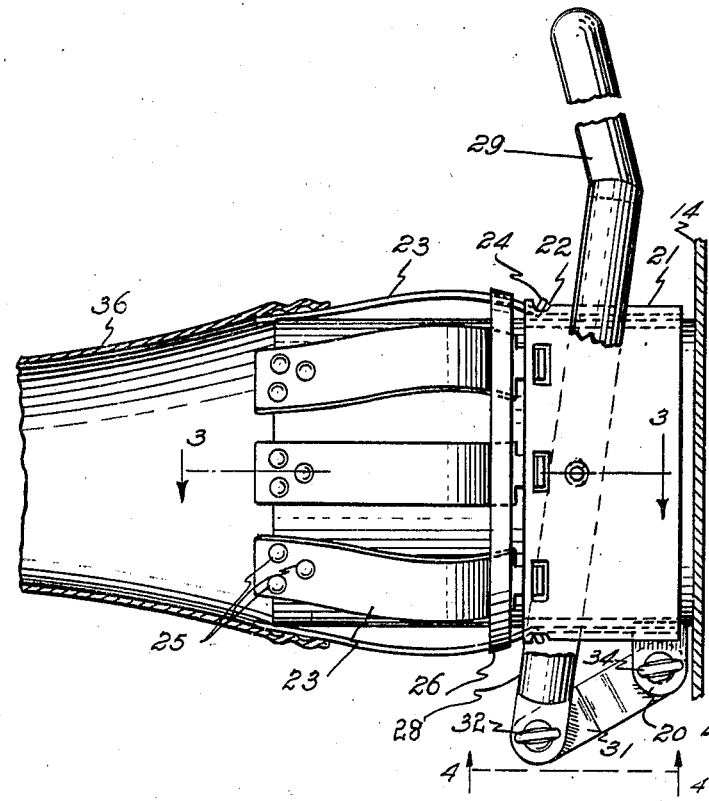
Fig. 2 is a side elevational view thereof showing only the nozzle-like device with slidably mounted plate partially broken away and showing a fragment of a casing in cross-section.
Figure 3:
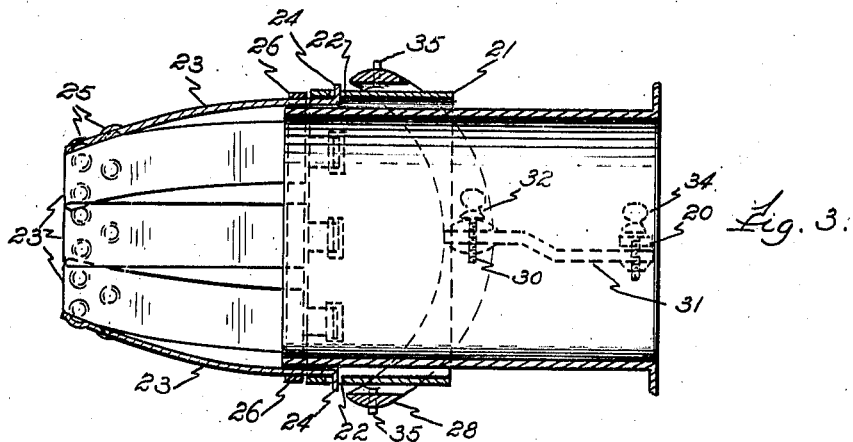
Fig. 3 is a cross-sectional view taken on a horizontal plane indicated by the lines 3—3 of Fig. 2.

The cylinder 19 is secured preferably by welding or equivalent means about the opening in pressure and mounting plate 14, and said cylinder is substantially longer than its diameter, as illustrated in Figs. 1, 2 and 3.

Figure 4:
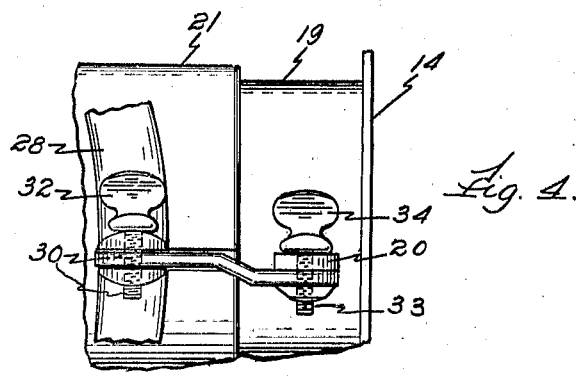
Fig. 4 is a view taken from the bottom on line 4—4 on Fig. 2 and showing certain parts broken away.

An apertured ear 20 is secured by welding or the like to said cylinder 19 as shown in Figs. 2 and 4. This provides means for connecting the lever mechanism to said cylinder as hereinafter described.

Figure 5:
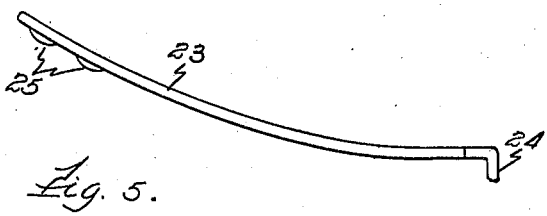
Fig. 5 is an enlarged side elevational view of one of the finger-like gripping members which are removably connected to the slidable collar as hereinafter described.

Reference numeral 21 designates a substantially cylindrical collar of greater diameter than the sleeve or cylinder 19, and it is slidably mounted on said cylinder 19 with a substantially loose fit to provide an annular space between said collar and said cylinder. Said collar has its forward edge portion formed with a plurality of spaced apart openings or slots 22 as illustrated in Fig. 2, which are in substantial circumferential alignment. A plurality of leaf-like, finger-like gripping and holding members are designated by numeral 23, and are formed of metal and these are all uniformly curved substantially along their central areas as illustrated in Figs. 2, 3 and 5. Each of said gripping members 23 has one end reduced and bent transversely and at substantially right angles to form retaining lugs 24. Said gripping members 23 are removably and hingedly connected to collar 21, by inserting said reduced ends in the respective slots 22, and are normally retained in such engagement by the angularly extending lugs 24. The outer or free end portions of each of said gripping members, preferably though not necessarily, carry a plurality of engaging bosses or lugs 25 which in the ilustration of the drawings are formed by striking and pressing outwardly from the opposite surface portions of the metal of which the gripping members are formed.

Reference numeral 26 designates a spring-like or elastic element or band, which is removably mounted about said gripping members 23 in substantially any position about the connected end portions thereof, one such position being illustrated in Fig. 2.

In my preferred form, I have illustrated a rubber belt or band which I find highly desirable because of its quick removability and its ability to be quickly cleansed and also because it does not retain meat or dirt particles which cannot be readily washed off. I desire it to be understood, however, that any suitable, stretchable spring might also be used in lieu of a rubber band. The operator may push or pull the collar 21 for the stated purpose by direct manual force applied thereto.

In order to provide convenient and quickly operable optional means for slidably moving collar 21, and retracting and projecting said gripping members 23, I provide a lever 28, which is preferably of yoke-like form as illustrated in the drawings. Said lever has an integral and upwardly projecting handle 29 as shown, and the arm portions of the lever 28 extend in curved paths to points below said cylinder 19, at which the extremities of said lever arms are bent in a common direction and into parallelism. Said lower bent ends of said lever arms are provided with aligned apertures, and a removable pin or pintle 30 is mounted therethrough as well as through the apertured end of a metal connecting link 31 which is shown in Figs. 1, 2 and 4. The end of said pintle 30 is shown as threaded, said threads engaging corresponding threads in the ends of one of the arms of yoke lever 28. Said pintle 30 is preferably provided with a suitable gripping knob or handle 32, to provide for easy removal thereof when the operator desires to dismantle the device for cleaning or other purposes.

The opposite end of the connecting link 31, which is illustrated as slightly offset, is pivotally connected to the ear 20 and thereby to cylinder 19, by a suitable pintle 33, which carries a knob or handle 34, and whose end is preferably similarly threaded to threadably engage suitable threads in the aperture of the connecting link 31.

As illustrated in Fig. 3, the collar 21 has mounted thereon at diametrically opposite points by welding or the like, suitable outwardly projecting studs 35. The two arm portions of the lever 28 are provided with suitable apertures therein at locations wherein said studs 35 extend through said lever arm apertures to thereby pivotally mount the said lever with respect to said slidable collar 21. As the lower ends of the lever arms are removably mounted, as described previously, said lever arms may be sufficiently spread to dismount said lever arms from studs 35 when it is desired to disassemble the unit.

The projected positions of the collar 21 and the leaf-like engaging elements 23 are illustrated in Figs. 1 and 3, and when in such position, it will be seen that due to the inward curvature of the gripping members 23, the free ends of said gripping members come relatively close together, and in some instances, even overlap at their forward corners to thereby define a circular area which is substantially less than the circumference of the cylinder 19, and consequently also substantially less than the cross-sectional area of the meat body to be placed into a casing or container.

This feature is highly advantageous in that it permits the operator to take a casing or package formed of stretchable material and place the open end on the projected free ends of the gripping members 23 when they are in the positions shown in Figs. 1 and 3, at the same time pulling the entrance end of the casing or container some distance over the free ends of said gripping members 23, as for example as illustrated in Fig. 2.

The operator will then grip the handle 29 and move it in the direction of the press to thereby slide collar 21 toward mounting plate 14 and simultaneously retract and cause spreading of the outer end portions of the gripping and holding members 23, and simultaneously stretching the engaged open end of the casing or container. Due to the elastic tendency of the casing or container, the container will thereby be mounted with its open entrance end about the outlet end of the cylinder 19, and thereupon the operator may either mechanically or manually press or push the ham through the cylinder 19 and into the casing or container 36.

Then the operator may either grip the enclosed ham or food body within the container and either pull it away so that the engaged casing or container end slips off the free ends of the gripping members, or he may grip the handle 29, and move the same back to the projected position illustrated in Figs. 1 and 3 to thereby release the container.

I desire to also point out that the optional provision of the projecting lugs or elements 25 on the forward ends of the gripping members 23, provide an irregular surface which engages the inner surface of the container with increased friction.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim:

1. In a device for facilitating the enclosing of a compressed food body within an opened end container, said device being adapted to be mounted at the outlet end of a press for forming compressed food bodies, a plate having an enlarged exit passage therethrough and adapted to be slidably mounted on a food press or the like so that the plate opening may be selectively positioned in registry with the outlet of the food press; a metal cylinder secured on said plate and about said opening and in perpendicular relation to said plate; a collar slidable exteriorly of and along said cylinder, said collar having a plurality of spaced apart openings therein; and a plurality of bent leaf-like gripping members having one corresponding end of each thereof removably engaging said collar slots respectively, said gripping members being bent so that their free ends extend inwardly; and a yieldable spring-like element about said gripping members adapted to normally hold the same against the outer portion of said cylinder, the retraction of said collar and said gripping members connected thereto causing the inner surfaces of said gripping members to slidably engage the outer periphery of said cylinder and being adapted to separate on such retraction to cause the outer portions of said gripping members to engage and hold the inner surface of a container during the insertion of the food body thereinto.

2. In a device for facilitating the insertion of a compressed meat body or the like into a tube-like container and adapted to be slidably mounted upon the outlet end of a meat press; a substantially flat plate having a passage therein providing for the passage therethrough of the compressed meat body; said plate being adapted to be selectively moved to obstruct the meat body press opening and to selectively register the said plate opening with the outlet of said meat press; a cylinder about said plate opening and extending outwardly therefrom; a plurality of bent package gripping members about said cylinder and normally projecting therebeyond, said gripping members extending inwardly at their outer ends to define an area of substantially less dimension than the cross-sectional area of said cylinder; a collar slidable on said cylinder, said gripping members being connected at one of their ends respectively to said collar; and lever means for sliding said collar forward and backward on such cylinder to selectively retract and spread the normally outer portions of said gripping members to cause such grippings members to engage and hold a tube-like covering during the inserting movement of the meat body.

3. In a device for facilitating the enclosing of a compressed food body within an opened end container, said device being adapted to be mounted at the outlet end of a press for forming compressed food bodies, a plate having an enlarged exit passage therethrough and adapted to be slidably mounted on a food press or the like so that the plate opening may be selectively positioned in registry with the outlet of the food press; said plate being selectively positionable to obstruct the press opening; a metal cylinder secured on said plate and about said opening and in perpendicular relation to said plate; a collar slidable exteriorly of and along said cylinder; a plurality of bent leaf-like gripping members having one corresponding end of each thereof loosely connected to said collar respectively, said gripping members being bent so that their free ends extend inwardly; spring means on said gripping members to normally hold the same toward each other and adjacent said cylinder; and a lever connected at its lower end to said cylinder and pivotally connected intermediate its ends to said collar, the retraction of said gripping members causing said gripping members to slidably engage the outer periphery of said cylinder and being adapted to cause the outer portions of said gripping members to separate and to engage and hold the inner surface of a container during the insertion of the food body thereinto.

4. In a device of the described class, an apertured baffle plate adapted to be slidably mounted on a food press to permit selective positioning thereof to obstruct the food press outlet opening or to permit passage through its own aperture of a pressed food body; a cylinder secured at one end to said plate and about the aperture therein; a collar slidably mounted on said cylinder; a plurality of curved arm-like gripping members connected at one end of each thereof to said collar, so that when projected outwardly the outer ends of said members are relatively close together; a connecting link pivotally connected at one end to said cylinder; a yoke shaped lever about said collar and pivotally connected at its lower end to said connecting link; and a spring-like element about said gripping members for holding said members toward each other and against the outer portion of said cylinder, the retraction of said lever being adapted to cause the outer portions of said members to spread and engage the inner surface of a tube-like open ended container to hold the latter during insertion thereinto of the food body.

5. In a device for facilitating the insertion of a compressed body of meat or the like into a tube-like container, and adapted to be positioned over an aperture of a supporting member through which the body is adapted to be passed; a metal cylinder having an inlet opening and an exit opening therein; a mounting plate on one end of said cylinder having an opening therein in alignment with the inlet opening of said cylinder and providing means for movably mounting said device on a stationary member, said mounting plate being adjustably mounted to provide for alignment or disalignment of its opening with the aperture in the supporting member; a cylindrical collar about said cylinder and slidable thereon; a plurality of individual finger members removably and pivotally connected at their inner ends respectively to said slidable collar, each of said members being curved inwardly and normally projecting forward of the exit opening of said cylinder; and a pivotal lever operatively connected to said slidable collar and connected at its lower end to said cylinder and adapted, when moved away from said exit opening, to retract said finger members and simultaneously spread the outer ends thereof to thereby engage the inner surface of a tubular container and hold the same during insertion of the body of meat or the like thereinto.

6. In a means of the described class for selectively gripping and holding an open ended container during a food body inserting operation; a passaged substantially cylindrical nozzle through which the food body is forcibly movable; a collar slidable about said nozzle and movable longitudinally, said collar having a plurality of spaced apart openings therein; a plurality of finger-like inwardly curved movable gripping members having their corresponding ends pivotally and removably engaging the openings of said collar to provide for outward and inward pivotal movement of said gripping members whereby retracting movement of said collar causes said gripping members to slidably engage the end portion of said nozzle to cause the gradual spreading apart of said gripping members; and lever mechanism pivotally connected to said nozzle and pivotally connected at an intermediate point to said collar for selectively moving said collar along said nozzle and for selectively retracting, projecting and spreading apart said gripping members to cause the outer end portions of said gripping members, upon spreading apart movement, to engage and hold the open end of a container.

JOHN OPIE.